> United States Patent Office 3,764,476
Patented Oct. 9, 1973

3,764,476
PROCESS FOR PRODUCING MICROBIAL CELLS
Shigeo Abe, Tokyo, and Mamoru Kohata, Kawasaki, Japan, assignors to Kyowa Hakko Kogyo Co., Ltd., Tokyo, Japan
No Drawing. Filed Oct. 21, 1971, Ser. No. 191,480
Claims priority, application Japan, Oct. 28, 1970, 45/94,329
Int. Cl. C12b 1/00
U.S. Cl. 195—49                 11 Claims

ABSTRACT OF THE DISCLOSURE

A process for producing microbial cells which comprises culturing a methanol-assimilating bacterium belonging to Protaminobacter ruber in an aqueous nutrient medium, controlling the addition of methanol to said medium as the main carbon source to effect rapid growth of microbial cells in said medium, and recovering the microbial cells therefrom.

---

This invention relates to a process for producing microbial cells which comprises culturing a methanol-assimilating bacterium in a medium containing methanol, which can be supplied at a low cost, as a main carbon source and recovering remarkable amounts of microbial cells.

Heretofore, microorganisms have been known which can grow to a certain degree utilizing methanol as the sole source of carbon. However, no methanol-assimilating bacteria showing excellent growth have been reported.

Taking notice of this point, the present inventors have, as a result of various studies, obtained methanol-assimilating bacteria which show very excellent growth in a medium containing methanol as a carbon source and thus have accomplished the present invention.

Moreover, in accordance with the process of this invention, it is now possible to produce microbial cells or cell components, such as proteins, carotenoids, etc., which are useful as a medicine or a feed, advantageously on an industrial scale.

Any of the methanol-assimilating strains belonging to the genus Protaminobacter ruber can be employed in the present invention but especially preferable are the strains of Protaminobacter ruber var. machidanus, which is the new variety of Protaminobacter ruber, found by the present inventors for the first time and thus named. The typical strains are Protaminobacter ruber var. machidanus G-253 (ATCC 21611), G-254 (ATCC 21612), G-257 (ATCC 21613) and G-259 (ATCC 21614). All of these strains have been isolated from soil.

The microbiological properties of the strains of Protaminobacter ruber var. machidanus G-253 (ATCC 21611), G-254 (ATCC 21612), G-257 (ATCC 21613) and G-259 (ATCC 21614) are as follows:

Morphological observations (A) Microscopical observations (methanol-containing synthetic agar medium):

(1) Form: Usually rods, occurring singly or in pairs. Occasionally branching cells found.
(2) Size: 0.5 to 0.8 by 2 to 3 microns
(3) Gram stain: Negative
(4) Motility: Positive
(5) Flagellum: A single polar flagellum
(6) Spore: None (B) Agar colonies (methanol-containing synthetic agar medium, 30° C. 4 days):

(1) Form: Circular (1 to 2 mm. in diameter)
(2) Surface: Smooth
(3) Edge: Entire
(4) Elevation: Flat
(5) Luster: Glistening to dull
(6) Color: Pink (C) Agar colonies (bouillon agar medium):

Growth not excellent
Reddish small colonies formed

Physiological properties:

(1) Growth temperature: Good growth between 25–35° C., capable of growing between 20–40° C.
(2) Growth pH: Good growth between pH 6.5–8.0, capable of growing between pH 6–9
(3) Reduction of nitrates: Positive
(4) Catalase: Positive
(5) Utilization of nitrogen sources: Ammonium salts, nitrates, urea and amino acids can be utilized by any of the four strains.
(6) Utilization of carbon sources: Methanol, glucose, glycerol, acetic acid and ethanol can be utilized by any of the four strains. Monomethylamine can be utilized by the strains of G–254, G–257 and G–259, but not by the strain of G–253. Succinic acid can be utilized by the strains of G–253 and G–259, but not by the strains of G–254 and G–257. Citric acid cannot be utilized by any of the four strains. Oxalic acid can be utilized by the strain of G257, but not by the strains of G–253, G–254 and G–259.

The composition of the medium used in growth of the above-noted strains is:

| | | |
|---|---|---|
| Methanol (not sterilized) | ml | 20 |
| $NH_4NO_3$ | g | 3.0 |
| $KH_2PO_4$ | g | 0.5 |
| $Na_2HPO_4$ | g | 1.3 |
| $MgSO_4 \cdot 7H_2O$ | g | 1.0 |
| $FeSO_4 \cdot 7H_2O$ | mg | 20 |
| $CaCl_2$ | mg | 10 |
| $CaCO_3$ | g | 20.0 |
| Corn steep liquor | g | 0.5 |
| Distilled water | ml | 1000 | ph 7.0 (in the case of agar medium, agar is to be added so that the concentration thereof may be 20 g./l.)

The identification of these four strains with the above-mentioned properties was made according to Bergey's Manual of Determinative Bacteriology, 7th edition and it was found that all the four strains apparently belonged to the genus Protaminobacter. Of the species of the genus Protaminobacter, all the four strains have almost the same properties as those of Protaminobacter ruber. However, since these strains are characterized as having no citric acid-assimilability, and because growing on methanol is very excellent, they are determined to be the variety of Protaminobacter ruber and named Protaminobacter ruber var. machidanus.

As mentioned above, any of said four strains can utilize methanol as the sole source of carbon and, besides, can grow on bouillon agar medium containing no methanol.

Further, the strains employed in the present invention are characterized as being capable of growing to provide a yield of as much as 50 g./l. on the basis of dry weight by adding methanol to the medium little by little during culturing, and such an excellent growth of the strains utilizing methanol as the main carbon source is, indeed, a new finding which has not yet been reported on other methanol-assimilating bacteria.

Culturing according to the present invention is preferably carried out under aerobic conditions. Culturing temperature is preferably between 20° C. and 40° C. The medium used properly contains methanol as a carbon source; an organic or inorganic nitrogen-containing substance such as urea, ammonia, ammonium chloride, nitrate, etc. or a natural nitrogen-containing substance such as corn steep liquor (hereinafter referred to as CSL), yeast extract, meat extract, peptone, etc. as a nitrogen source; phosphates such as potassium dihydrogen phosphate, disodium hydrogenphosphate, etc.; various inorganic salts such as magnesium sulfate, manganese sulfate, ferrous sulfate, zinc sulfate, calcium chloride, etc.; and growth promoting agents. Any of said four strains does not require vitamins for growth thereof, while the addition of natural organic substances such as yeast extract, meat extract, CSL, etc. is effective to increase the yield of microbial cells. It is preferable to maintain the pH of the medium during culturing within a range where the strain of the present invention can grow, i.e., pH 6-9, since the pH of the medium is remarkably lowered when the strains grow.

Recovery of a large quantity of microbial cells, which is the object of the present invention, can be achieved by adding methanol little by little to the liquid medium during culturing in such an amount that does not inhibit the growth of the bacteria thereby increasing the yield of microbial cells remarkably. Methanol may be added continuously or intermittently to the medium during culturing, however, the amount of methanol in the medium must be maintained in a concentration at which the growth of the microorganisms used is not inhibited. Although the manner of addition of methanol depends upon the microorganisms used, medium composition, and other various culturing conditions, it is preferable to add methanol continuously or intermittently so that the methanol concentration in the medium after the addition may be maintained below 6.0% (v./v.). There may be mentioned, by way of example, a process comprising adding methanol continuously to the nutrient medium at a rate of from about 0.2 to about 1.0% (v./v.) per hour after culturing the bacterium for one hour in a medium containing from about 0.1 to 6.0% (v./v.) of initially added methanol.

After the completion of culturing, the supernatant is removed by centrifuge and the precipitate is washed with water to recover microbial cells.

The following examples will facilitate understanding of the present invention.

EXAMPLE 1

Each 10 ml. of the medium comprising

| | | |
|---|---|---|
| Methanol (not sterilized) | ml | 20 |
| $NH_4NO_3$ | g | 4.0 |
| $KH_2PO_4$ | g | 1.0 |
| $Na_2HPO_4$ | g | 2.6 |
| $MgSO_4 \cdot 7H_2O$ | g | 1.0 |
| $FeSO_4 \cdot 7H_2O$ | mg | 20 |
| $CaCl_2$ | mg | 10 |
| $MnSO_4 \cdot 4H_2O$ | mg | 5 |
| CSL | g | 0.5 |
| Distilled water | ml | 1000 |
| (pH 7.0). | | | were poured into test tubes. Each of the strains shown in Table 1 were inoculated thereinto from a methanol-containing synthetic agar slant medium in a conventional manner and cultured with shaking at 30° C. for 2 days. The amounts of microbial cells obtained are also shown in Table 1.

TABLE 1

| Strains used: | Amounts of dry cells (g./l.) |
|---|---|
| *Protaminobacter ruber* ATCC 8457 | 1.5 |
| *Protaminobacter ruber* var. *machidanus*: | |
| G-253 (ATCC 21611) | 5.6 |
| G-254 (ATCC 21612) | 7.3 |
| G-257 (ATCC 21613) | 6.0 |
| G-259 (ATCC 21614) | 5.4 |

EXAMPLE 2

Each 20 ml. of the medium comprising

| | | |
|---|---|---|
| $NH_4NO_3$ | g | 5.0 |
| $KH_2PO_4$ | g | 1.0 |
| $Na_2HPO_4$ | g | 2.6 |
| $FeSO_4 \cdot 7H_2O$ | mg | 20 |
| $CaCl_2$ | mg | 10 |
| $MnSO_4 \cdot 4H_2O$ | mg | 5 |
| CSL | g | 3.0 |
| $CaCO_3$ | g | 20 |
| Distilled water | ml | 1000 |
| (pH 7.0). | | | were poured into 250-ml. Erlenmeyer flasks and each of the strains shown in Table 2 were inoculated thereinto in the same manner as in Example 1. Methanol was added to the medium by an amount equal to 2% (v./v.) based on the initial volume at the time of inoculation, by an amount equal to 1% (v./v.) on the second day and by an amount equal to 2% (v./v.) on the third day and culturing was carried out at 30° C. for 5 days with shaking. (Thus the total amount of methanol added equaled 5% by volume.) The amounts of microbial cells obtained as the result are also shown in Table 2.

TABLE 2

| Strains used: | Amounts of dry cells (g./l.) |
|---|---|
| *Protaminobacter ruber* var. *machidanus*: | |
| G-253 (ATCC 21611) | 10.3 |
| G-254 (ATCC 21612) | 11.5 |
| G-257 (ATCC 21613) | 12.2 |
| G-259 (ATCC 21614) | 9.4 |

EXAMPLE 3

Strains of *Protaminobacter ruber* var. *machidanus* G-253 (ATCC 21611) and G-257 (ATCC 21613) were, respectively, inoculated into five-liter jar fermenters, each containing 3 liters of a medium comprising:

| | | |
|---|---|---|
| Methanol (not sterilized) | ml | 10 |
| $KH_2PO_4$ | g | 1.0 |
| $Na_2HPO_4$ | g | 2.6 |
| $(NH_4)_2SO_4$ | g | 5.0 |
| $FeSO_4 \cdot 7H_2O$ | mg | 50 |
| $CaCl_2$ | mg | 50 |
| $MnSO_4 \cdot 4H_2O$ | mg | 10 |
| CSL | g | 5 |
| City water | ml | 1000 |
| (pH 7.0). | | |

Culturing was carried out with aeration and stirring at 30° C. During culturing, aqueous ammonia was added to the medium to prevent the lowering of the pH caused by propagation of the strain and thus the pH was maintained between 6 and 8. Also when the pH of the medium was raised with the complete consumption of the methanol contained in the medium, methanol was added thereto so that the methanol concentration was 1% (v./v.). After 40 hours of cultivation, the amounts of dry cells obtained were respectively 41 g./l. from the total addition of 20% methanol by volume in the case of the G-253 (ATCC 21611) strain and 38 g./l. from the total addition of 17% methanol by volume in the case of the G-257 (ATCC 21613) strain.

EXAMPLE 4

Culturing was carried out in the same manner as in Example 3 except that methanol was added continuously to the medium by an amount varying from 0.5 to 0.7% (v./v.) per hour after 10 hours from the inoculation, that culturing was carried out at 35° C. and that the pH of the medium was maintained at 7.0. As the result, 50 g./l. in the case of the G-253 (ATCC 21611) strain, and 46 g./l. in the case of the G-257 (ATCC 21613) strain of dry cells were obtained from the total addition of 22% methanol by volume after 45 hours of cultivation.

What is claimed is:

1. A process for producing microbial cells which comprises culturing a methanol-assimilating bacterium belonging to *Protaminobacter ruber* var. *machidanus* in an aqueous nutrient medium, controlling the addition of methanol to said medium as the main carbon source to effect rapid growth of microbial cells in said medium, and isolating the microbial cells therefrom.

2. The process of claim 1, wherein the bacterium are cultured in a nutrient medium maintained at a pH of from about 6 to 9 during culturing.

3. The process of claim 1, wherein methanol is added to the nutrient medium little by little in increments to sustain excellent growth of said bacterium and in such an incremental amount that the methanol does not inhibit the growth of said bacterium.

4. The process of claim 3 in which the total amount of methanol added to the nutrient medium during culturing may vary from about 2 to about 30% by volume of the volume of said medium.

5. The process of claim 3 in which the methanol is intermittently added to the nutrient medium so that the methanol concentration in the medium after addition is mainained below 6.0% (v./v.).

6. The process of claim 3 in which the methanol is continuously added to the nutrient medium at a rate of from about 0.2 to about 1.0% by volume based on the volume of the medium per hour after culturing the bacterium for one hour in a medium containing from about 0.1 to 6.0 volume percent of initially added methanol.

7. The process of claim 1 in which culturing of said bacterium is effected at 20° to 40° C.

8. The process of claim 1 in which said bacterium is *Protaminobacter ruber* var. *machidanus* G-253, ATCC 21611.

9. The process of claim 1 in which said bacterium is *Protaminobacter ruber* var. *machidanus* G-254, ATCC 21612.

10. The process of claim 1 in which said bacterium is *Protaminobacter ruber* var. *machidanus* G-257, ATCC 21613.

11. The process of claim 1 in which said bacterium is *Protaminobacter ruber* var. *machidanus* G-259, ATCC 21614.

References Cited

UNITED STATES PATENTS 3,663,370  5/1972  Kono et al. _____ 195—49

OTHER REFERENCES

P. Johson and J. Quayle: "Microbial Growth on C Compounds," Biochem. J. (1964), 93, pp. 281–290.

ALVIN E. TANENHOLTZ, Primary Examiner

T. G. WISEMAN, Assistant Examiner

U.S. Cl. X.R.

195—115, 117